(12) United States Patent
Dallaglio et al.

(10) Patent No.: US 10,749,624 B2
(45) Date of Patent: Aug. 18, 2020

(54) METHOD FOR MANAGING A TELECOMMUNICATION NETWORK

(71) Applicant: SCUOLA SUPERIORE DI STUDI UNIVERSITARI E DI PERFEZIONAMENTO SANT'ANNA, Pisa (IT)

(72) Inventors: Matteo Dallaglio, Reggio Nell'Emilia (IT); Nicola Sambo, Leghorn (IT); Filippo Cugini, Pontedera (IT); Piero Castoldi, Vicopisano (IT)

(73) Assignee: SCUOLA SUPERIORE DI STUDI UNIVERSITARI E DI PERFEZIONAMENTO SANT'ANNA, Pisa (IT)

( * ) Notice: Subject to any disclaimer, the term of this patent is extended or adjusted under 35 U.S.C. 154(b) by 0 days.

(21) Appl. No.: 16/333,097

(22) PCT Filed: Sep. 27, 2017

(86) PCT No.: PCT/IB2017/055911
§ 371 (c)(1),
(2) Date: Mar. 13, 2019

(87) PCT Pub. No.: WO2018/060887
PCT Pub. Date: Apr. 5, 2018

(65) Prior Publication Data
US 2019/0253175 A1    Aug. 15, 2019

(30) Foreign Application Priority Data

Sep. 27, 2016    (IT) .................. 102016000096594

(51) Int. Cl.
*H04J 14/02*    (2006.01)
*H04B 10/077*    (2013.01)
(Continued)

(52) U.S. Cl.
CPC .......... *H04J 14/0271* (2013.01); *H04B 10/03* (2013.01); *H04B 10/0773* (2013.01);
(Continued)

(58) Field of Classification Search
None
See application file for complete search history.

(56) References Cited

U.S. PATENT DOCUMENTS

| 7,180,856 | B1 * | 2/2007 | Breslau | ............... | H04L 12/1868 370/230 |
| 8,732,296 | B1 * | 5/2014 | Thomas | ............. | H04L 63/1441 370/230 |

(Continued)

FOREIGN PATENT DOCUMENTS

| WO | WO 2014/037131 | A2 |   | 3/2014 |
| WO | WO-2014037131 | A2 | * | 3/2014 |

OTHER PUBLICATIONS

Castoldi et al: "A Monitoring Architecture for Self-Configurable Optical Networks", ICTON 2015, Jul. 5-9, 2015, paper We.C1.1, p. 1-4 (Year: 2015).*

(Continued)

*Primary Examiner* — Li Liu
(74) *Attorney, Agent, or Firm* — Stein IP, LLC

(57) ABSTRACT

A method for managing a telecommunication network comprising the steps of identification, by the central controller, of an updated condition of availability of resources of the network, and association of a plurality of updated sequences of instructions, comparison of the plurality of updated sequences of instructions with a plurality of not updated sequences of instructions associated with the last condition of availability. In case that the plurality of updated sequences of instructions is different from the plurality of not updated sequences of instructions, a step is provided of sending an updated sequence of instructions to each nodal (Continued)

device, on the basis of the service class of the data traffic of the device. A step is furthermore provided of checking, by the local controller, a condition of service of the data traffic at time ranges δ, said updated sequence of instructions associating to each condition of service an optimal working status to be attributed to the data traffic. A step is then provided of comparison of the condition of service with an optimal condition of service and, in case that the condition of service is different, a step is provided of starting, by the local controller, the updated sequence of instructions for changing a status of the data traffic. It is further provided a step of sending to the central controller data concerning the change of the working status.

7 Claims, 1 Drawing Sheet

(51) Int. Cl.
  *H04B 10/079* (2013.01)
  *H04L 1/00* (2006.01)
  *H04B 10/03* (2013.01)
  *H04Q 1/00* (2006.01)

(52) U.S. Cl.
  CPC ..... *H04B 10/0779* (2013.01); *H04B 10/0795* (2013.01); *H04B 10/0799* (2013.01); *H04J 14/0272* (2013.01); *H04L 1/003* (2013.01); *H04L 1/009* (2013.01); *H04L 1/0009* (2013.01); *H04J 2203/0003* (2013.01); *H04J 2203/0021* (2013.01); *H04J 2203/0064* (2013.01); *H04Q 1/00* (2013.01)

(56) References Cited

U.S. PATENT DOCUMENTS

| | | | | |
|---|---|---|---|---|
| 8,755,685 B2* | 6/2014 | Zheng | ............... | H04L 45/22 398/2 |
| 9,137,033 B2* | 9/2015 | Ogielski | ............... | H04L 41/00 |
| 9,179,204 B2* | 11/2015 | Mitsui | ............... | H04Q 11/0067 |
| 9,369,200 B1* | 6/2016 | Schmidtke | ............ | H04B 10/038 |
| 2003/0235187 A1* | 12/2003 | Iwama | ............. | H04M 7/1285 370/352 |
| 2004/0068516 A1* | 4/2004 | Lee | ............... | G06F 16/182 |
| 2012/0170486 A1* | 7/2012 | Mohapatra | ............. | H04L 45/025 370/254 |
| 2013/0236169 A1* | 9/2013 | Gaudette | ............ | H04B 10/0793 398/25 |
| 2014/0098710 A1* | 4/2014 | Ong | ............... | H04L 41/12 370/255 |
| 2014/0126899 A1* | 5/2014 | Prakash | ............. | H04B 10/032 398/5 |
| 2015/0195126 A1* | 7/2015 | Vasseur | ............... | H04L 41/5025 370/218 |
| 2015/0215200 A1* | 7/2015 | Bottari | ............... | H04Q 3/0079 370/228 |
| 2015/0249593 A1* | 9/2015 | Alvarez | ............. | H04L 41/0803 370/241 |
| 2015/0358235 A1* | 12/2015 | Zhang | ............... | H04L 45/745 370/230 |
| 2016/0037239 A1* | 2/2016 | Chhillar | ............. | H04Q 11/0003 398/49 |
| 2016/0094398 A1* | 3/2016 | Choudhury | ............. | H04L 45/42 370/254 |
| 2016/0182146 A1* | 6/2016 | Schmidtke | ............ | H04B 10/038 398/2 |
| 2017/0085316 A1* | 3/2017 | Al Sayeed | ............. | H04B 10/03 |
| 2017/0201452 A1* | 7/2017 | Shivhare | ............. | H04L 45/22 |
| 2017/0223436 A1* | 8/2017 | Moynihan | .......... | H04Q 11/0003 |
| 2017/0257439 A1* | 9/2017 | Wang | ............... | H04L 12/4641 |
| 2017/0317953 A1* | 11/2017 | Sareen | ............. | H04L 49/25 |
| 2019/0273679 A1* | 9/2019 | Zhao | ............... | H04L 45/42 |

OTHER PUBLICATIONS

International Search Report dated Dec. 13, 2017, issued to International Application No. PCT/IB2017/055911.
PCT Written Opinion of the International Searching Authority dated Dec. 13, 2017, issued to International Application No. PCT/IB2017/055911.

* cited by examiner

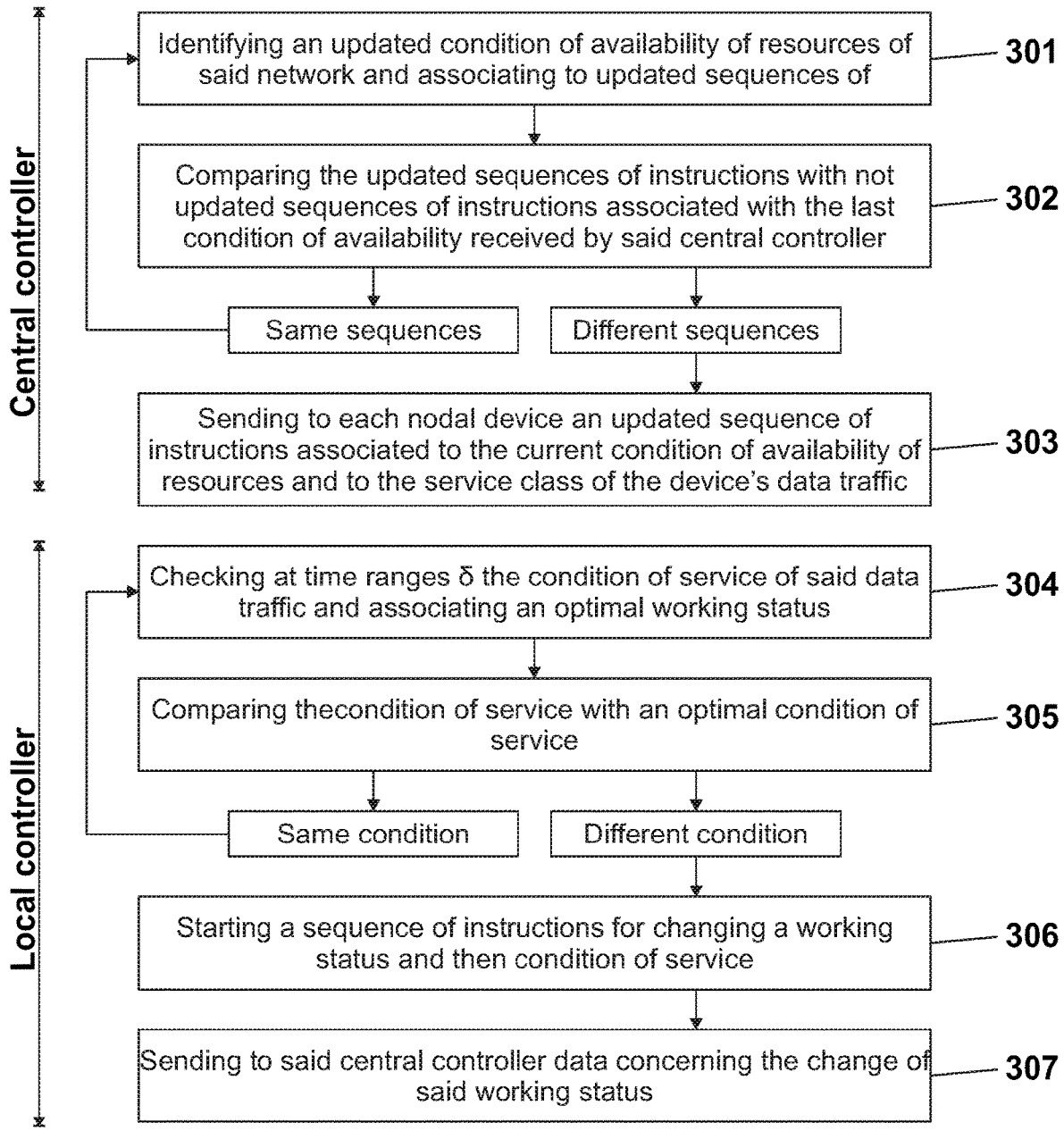

METHOD FOR MANAGING A TELECOMMUNICATION NETWORK

CROSS-REFERENCE TO RELATED APPLICATIONS

This application is a national stage of International Application No. PCT/IB2017/055911, filed Sep. 27, 2017, which claims the benefit of priority to Italian Application No. 102016000096594, filed Sep. 27, 2016, in the Italian Patent and Trademark Office, the disclosures of which are incorporated herein in their entireties by reference.

FIELD OF THE INVENTION

The present invention relates to a method for managing a telecommunication network according to the model of finite state machine.

DESCRIPTION OF THE PRIOR ART

Telecommunication networks are evolving towards ever-increasing programmability, making configuration of network devices more flexible and configurable remotely based on parameters that can be upgraded as needed (for example, transmission parameters such as "bit rate"). Network management and control must therefore adjust to this increase in programmability.

To allow a high system programmability, it is necessary to instruct all network elements about the actions they must take in response to predetermined events. For example, a minor failure, such as the degradation of the BER (Bit Error Rate), may imply a reconfiguration action, such as an increased redundancy in transmission.

However, currently, the device is being instructed at the time of its installation and this instruction can not be remotely modified afterwards. This greatly reduces the flexibility of the device itself within the network.

A solution to this problem is proposed in "Active stateful PCE with hitless LDPC code adaptation [Invited]" of F. Cugini et al. On the Journal of Optical Communications and Networking the February 2015. This paper proposes a solution where each network device has a local controller that detects a signal degradation and communicates it to the central controller, which decides how to react to degradation. For example, it decides to increase the encoding bits. The central controller then communicates to the local controllers (for example, the transmitter and the receiver) the changing of transmitting parameters. Local controllers will be responsible for changing the transmission parameters.

However, since the central controller needs to compute the solution of failure of each connected local device, in the event of many failures at the same time, there may be strong slowdowns, even in the order of a few seconds, leading to the slowdown in the recovery of data traffic.

Another example is the document WO2014037131, which describes a method for communication of optical signals that uses a plurality of optical paths, for such as "1+1 protection". Even this document, however, provides that is the central controller to intervene in case of degradation of the quality of the signal transmission, carrying out an action of recovery that improves this quality. Furthermore, this recovery action is made by diverting the signal the transmission over a different path, thus reducing the overall free resources of the system.

SUMMARY OF THE INVENTION

It is therefore a feature of the present invention to provide a method for managing a telecommunication network that allows the remote reprogramming of network devices to adapt them to the current network condition.

It is also a feature of the present invention to provide such a method that ensures a good speed of resolution of the problem, and that does not incur any slowdowns if there is an excessive accumulation of failures at the same time.

These and other advantages are achieved by a method for managing a telecommunication network, said network comprising:
 a central controller arranged to check a condition of availability of the resources of the network;
 a plurality of nodal devices, each device for carrying out a data traffic, to said data traffic being attributed a working status and a service class selected from a plurality of service classes arranged to define the priority of the data traffic, each nodal device comprising a local controller and being configured to work alternatively, or at the same time, as:
  data transmitter;
  data receiver;
  transit node for data traffic between a sender and a receiver;
whose main feature is that it comprises the steps of:
 identifying, by means of the central controller, an updated condition of availability of resources of the network, to said updated condition of availability being associated a plurality of updated sequences of instructions;
 comparing the plurality of updated sequences of instructions with a plurality of not updated sequences of instructions associated with the last condition of availability received before the updated condition;
 in case that the plurality of updated sequences of instructions is different from the plurality of not updated sequences of instructions, sending by means of the central controller an updated sequence of instructions to each nodal device on the basis of the service class of the device;
 receiving, by means of each nodal device, the updated sequence of instructions sent by the central controller;
 checking, by the local controller, a condition of service of the data traffic at time ranges δ, said updated sequence of instructions associating to each condition of service an optimal working status to be attributed to the data traffic;
 comparing the condition of service with an optimal condition of service;
 in case that the condition of service is different from the optimal condition of service, starting, by the local controller, an updated sequence of instructions for changing a status of the data traffic;
 sending to the central controller, by means of each nodal device, data concerning the change of the working status.

This method allows the program of diagnosis and solution of the failures to be always updated on the current condition of availability of the resources of the network. Furthermore, it solves the problem of the slowdowns due to the accumulation of problems to be computed by the central controller, since each nodal device carries out locally its own diagnosis and communicates the change of the status only when the failure is repaired.

In particular, the condition of availability of the resources of the network is defined on the basis of the number of active connections and of the spectral resources occupied by such connections.

In particular, the service class defines the priority of each data traffic of each device. The sequence of instructions that is updated by the central controller is selected both on the basis of the condition of availability of the network resources, both on the basis of the particular service class of the data traffic of the nodal device to which the sequence of instructions is sent.

Advantageously, the data traffic is made through optical technology.

In particular, the step of checking the condition of service of the data traffic can be made by a local controller of a nodal device acting as receiver.

In this case, the step of checking the condition of service is carried out by checking at least one of the following parameters:
  BER (bit error rate);
  OSNR (Optical Signal-to-Noise Ratio);
  Q-factor;
  Chromatic Dispersion;
  PMD (Polarization Mode Dispersion).

Alternatively, the step of checking the condition of service of the data traffic is made by the local controller of a nodal device acting as sender.

In this case, the step of checking the condition of service is carried out by checking at least one of the following parameters:
  power of signal transmission;
  central frequency of the signal.

Advantageously, the sequence of instructions started by the nodal device provides to use the "YANG" language implemented to a model of finite state machine for analyzing the data traffic and for changing the status.

BRIEF DESCRIPTION OF THE DRAWINGS

Further characteristic and/or advantages of the present invention are more bright with the following description of an exemplary embodiment thereof, exemplifying but not limitative, with reference to the attached drawings in which:

FIG. 1 shows a flow-sheet of the method for managing a telecommunication network, according to the present invention.

DESCRIPTION OF A PREFERRED EXEMPLARY EMBODIMENT

FIG. 1 shows the steps of the method for managing a telecommunication network, according to the present invention.

In a first step, the central controller is adapted to check an updated condition of the availability of the network resources. In a predetermined way, on the basis of the condition of the network resources, the central controller can choose the sequence of instructions more appropriate for resolving possible minor failures affecting each nodal device of the network [301]. In particular, the central controller selects a plurality of sequences of instructions associated with the condition of the current network, each of which is suitable for a different service class attributable to the data traffic expressed by each nodal device.

The central controller compares then the plurality of updated sequences of instructions, and updated to the current condition of the network, with a plurality of sequences of instructions previously adopted [302]. In case that at least one sequence of instructions is different, the central controller proceeds sending the updated sequences of instructions to each nodal device of the network on the basis of the service class of the data traffic, or the data traffics, of the nodal device [303]. This way, the nodal devices are constantly updated to the sequence of instructions that best suits the condition of the resources of current network and the service classes of its data traffic.

Each nodal device, by a respective local controller, proceeds periodically, at time ranges $\delta$, to checking the condition of service of the data traffic of the single nodal device. To this condition of service it is also associated, in a predetermined way, an optimal working status of the device [304].

Such condition of service of the data traffic is then compared with a predetermined reference condition [305]. If this condition is different, for example due to a minor failure, the nodal device proceeds to start the updated sequence of instructions, in order to change the working status and, consequently, the condition of service of the device [306].

Finally, each nodal device delivers to the central controller data concerning the operations carried out and, in particular, the change of the working status of the device [307].

In order to exemplify the above described steps, consider a telecommunications network having the following specifications:
  informative speed: 100 Gb/s
  symbol speed: 28 Gbaud
  FEC (Forward Error Correction): 7%
  modulation format: PM-QPSK (Polarization Multiplexing Quadrature Phase Shift Keying)

Then consider that each nodal device of the network is programmed as a finite state machine composed by the following working states:
  "Steady", i.e. a status of normal operation of the device;
  "Fec-Baud-Adapt", i.e. a status in which the service code bits had to be increased.

In "Steady" state, the condition of service is considered optimal if the pre-FEC BER (i.e. the Bit Error Rate before the Forward Error Correction) is below a $9 \times 10^{-4}$ threshold. If the pre-FEC BER determined by the local controller passes this threshold, it starts a sequence of instructions of correction for changing the working status. In particular, in the considered example the sequence of instructions consists in switching to a more robust code, i.e. a FEC of 20% instead of 7% and a change of symbol speed at 31 Gbaud. In this case it passes to the working status of "Fec-Baud-Adapt".

If instead the service is located in the status "Fec-Baud-Adapt", and the pre-FEC BER returns under the threshold of $9 \times 10^{-4}$, a different sequence of instructions is executed to return to the "Steady" working status, and to a FEC of 7% and to a symbol speed of 28 Gbaud.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realize the different functions described herein could have a different nature without, for this reason, departing from the field of the invention. It is to be understood that the phraseology or terminology that is employed herein is for the purpose of description and not of limitation.

The invention claimed is:
1. A method for managing a telecommunication network, said network comprising:
  a central controller arranged to check a condition of availability of resources of said network;

a plurality of nodal devices, each nodal device for carrying out a data traffic, to said data traffic being attributed a working status and a service class selected from a plurality of service classes arranged to define the priority of said data traffic, each nodal device comprising a local controller and being configured to work alternatively, or at the same time, as:

data transmitter;

data receiver;

transit node for said data traffic between a sender and a receiver;

said method comprising the steps of:

periodically identifying, by means of said central controller, an updated condition of availability of resources of said network, to said updated condition of availability being associated a plurality of updated sequences of instructions;

comparing said plurality of updated sequences of instructions with a plurality of not updated sequences of instructions associated with the last condition of availability received by said central controller before said updated condition;

in case that said plurality of updated sequences of instructions is different from said plurality of not updated sequences of instructions, sending by means of said central controller an updated sequence of instructions to each nodal device, on the basis of said service class of said data traffic of said device;

receiving, by means of each nodal device, said updated sequence of instructions sent from said central controller;

periodically checking, by means of said local controller, a condition of service of said data traffic at time ranges δ, said updated sequence of instructions associating to each condition of service an optimal working status to be attributed to said data traffic;

comparing said condition of service with an optimal condition of service;

in case that said condition of service is different from said optimal condition of service, starting, by means of said local controller, an updated sequence of instructions for changing a status of said data traffic;

sending to said central controller, by means of each nodal device, data concerning the change of said working status.

2. The method for managing a telecommunication network, according to claim 1, wherein said data traffic is made through optical technology.

3. The method for managing a telecommunication network, according to claim 1, wherein said step of checking said condition of the service of said data traffic is made by a local controller of a nodal device acting as receiver.

4. The method for managing a telecommunication network, according to claim 3, wherein said step of checking said condition of the service is carried out by checking at least one of the following parameters:

BER (bit error rate);

OSNR (Optical Signal-to-Noise Ratio);

Q-factor;

Chromatic Dispersion;

PMD (Polarization Mode Dispersion).

5. The method for managing a telecommunication network, according to claim 1, wherein said step of checking said condition of the service of said data traffic is made by the local controller of a nodal device acting as sender.

6. The method for managing a telecommunication network, according to claim 5, wherein said step of checking said condition of service is carried out by checking at least one of the following parameters:

power of signal transmission;

central frequency of the signal.

7. The method for managing a telecommunication network, according to claim 1, wherein said sequence of instructions started by said nodal device provides to use the "YANG" language implemented to a model of finite state machine for analysing said data traffic and for changing said status.

* * * * *